F. J. WEISER.
ROPE MACHINE.
APPLICATION FILED AUG. 13, 1912.
1,110,472.
Patented Sept. 15, 1914.
2 SHEETS—SHEET 1.
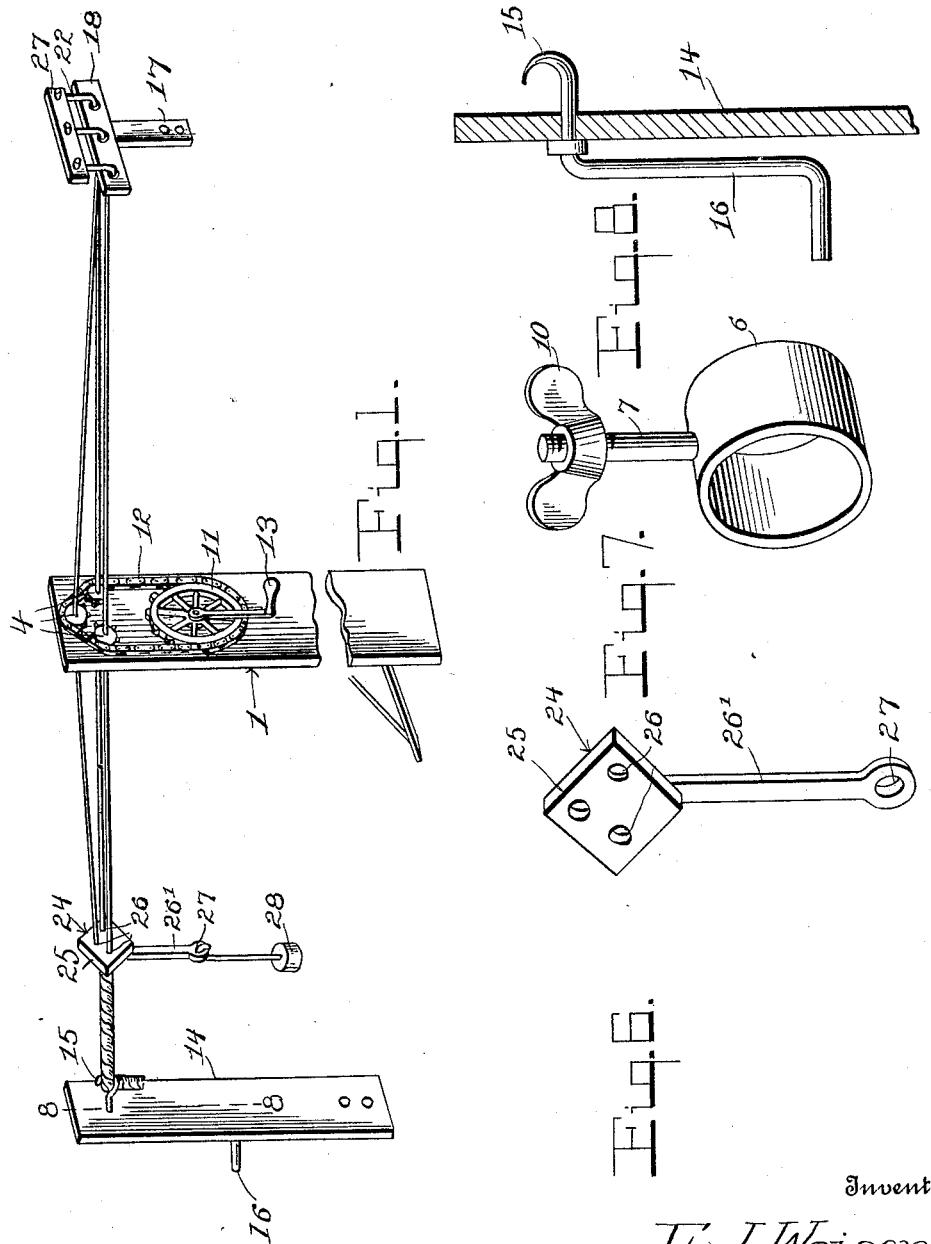
Witnesses
R. M. Jones
S. W. Shumm
Inventor
F. J. Weiser.
By Chandler & Chandler
Attorneys F. J. WEISER.
ROPE MACHINE.
APPLICATION FILED AUG. 13, 1912.
1,110,472.
Patented Sept. 15, 1914.
2 SHEETS—SHEET 2.
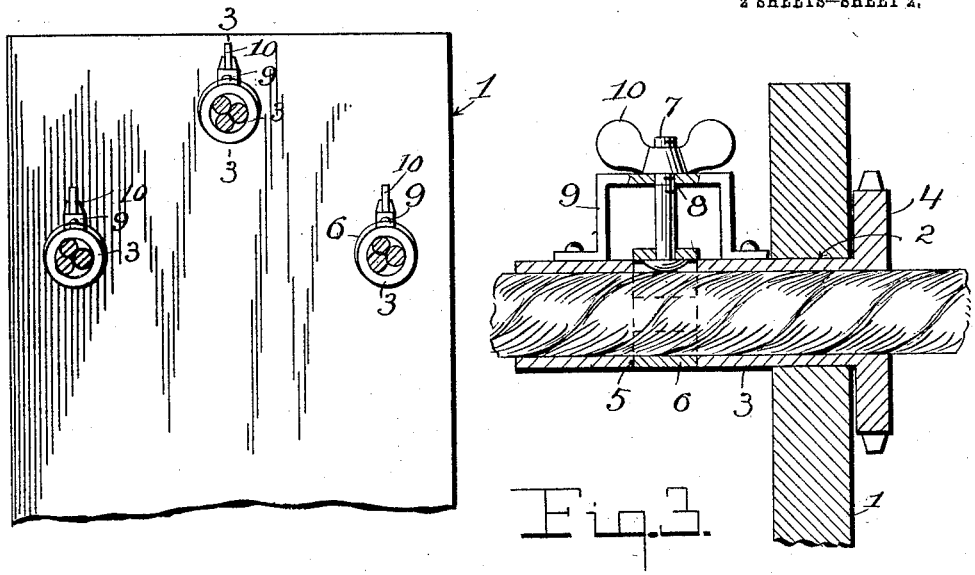
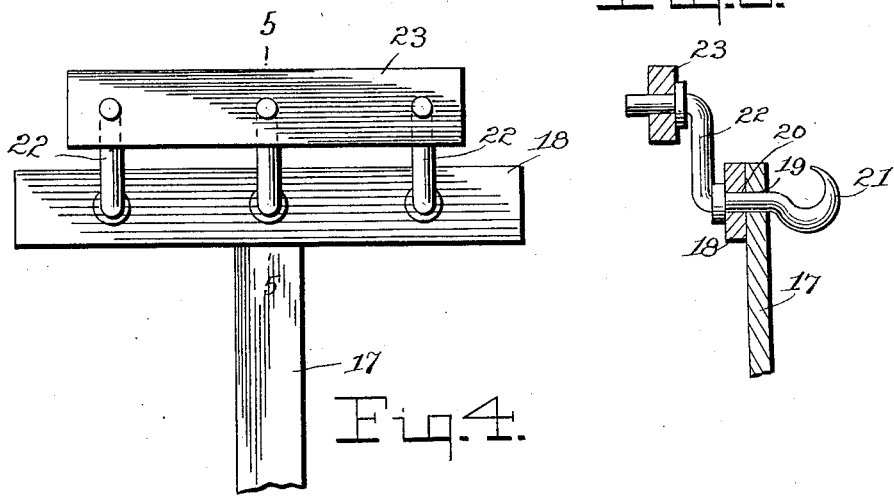
Witnesses
R. N. Jones
S. W. J. Kimmel
Inventor
F. J. Weiser
By
Chandler & Chandler
Attorneys

UNITED STATES PATENT OFFICE.

FRANK J. WEISER, OF NORWOOD, MINNESOTA.

ROPE-MACHINE.

1,110,472.  Specification of Letters Patent.  Patented Sept. 15, 1914.

Application filed August 13, 1912. Serial No. 714,913.

*To all whom it may concern:*

Be it known that I, FRANK J. WEISER, a citizen of the United States, residing at Norwood, in the county of Carver, State of Minnesota, have invented certain new and useful Improvements in Rope-Machines; and I do hereby declare the following to be a full, clear, and exact description of the invention, such as will enable others skilled in the art to which it appertains to make and use the same.

The present invention is directed to new and useful improvements in rope machines and has for its object to provide a novel construction by which rope may be quickly made by hand from lengths or strands of cord or twine or the like, the same being particularly adapted for forming in continuous lengths twine or cord which has been left over from binding machines or the like.

With these and other objects in view, this invention resides in the novel features of construction, formations, combinations and arrangements of parts to be hereinafter more fully described, claimed and illustrated in the accompanying drawings, in which:—

Figure 1 is a perspective view showing the manner in which the device and its parts are arranged when operated. Fig. 2 is a rear elevation of the main twisting frame. Fig. 3 is a sectional view on the line 3—3 of Fig. 2. Fig. 4 is a rear elevation of the supporting device. Fig. 5 is a sectional view on the line 5—5 of Fig. 4. Fig. 6 is a detail perspective view of the strand guide. Fig. 7 is a similar view of one of the clamping rings. Fig. 8 is a sectional view on the line 8—8 of Fig. 1.

Referring to the drawings, the numeral 1 designates a main twisting frame, which is formed preferably from a rectangular shaped board, and is provided near its upper end with a plurality of triangularly arranged openings 2, and in which are journaled the hubs 3 of the gears 4. The hubs 3 are each provided with diametrically opposed slots 5 in which the rings 6 operate. Each ring is provided with a threaded shank 7, which passes through a perforation 8 formed in the bracket 9 mounted upon the hub, and are engaged by the winged nuts 10, whereby said ring may be operated to firmly clamp the strands which pass through the hubs 3.

Rotatably mounted upon the main twisting frame 1 and below the gears 4 is a master gear 11, over and around which passes the chain 12, said chain also being passed around the gears 4 so that when the gear 11 is rotated by the crank 13 corresponding movement will be imparted to the gears 4.

Arranged adjacent the frame 1 is a standard 14, having rotatably mounted near its upper end a hook 15, to which is secured an operating crank 16, the purpose of said hook will be hereinafter mentioned.

Arranged adjacent the frame 1, and upon the side opposite to that upon which the standard 14 is arranged is an upright 17, the upper end of which being provided with a horizontally disposed bar 18, said bar being provided with a series of alined perforations 19, and in which are journaled the shanks 20 of the hooks 21, said shanks terminating in crank handles 22. The crank handles 22 are connected by a link 23, so that all hooks may be rotated simultaneously, or upon removal of said link any one of the hooks may be rotated independently.

A strand guide 24 is provided, and consists of a plate 25, said plate being provided with a series of triangularly arranged apertures 26, said apertures being for the purpose of receiving the strands so that the same will be firmly twisted upon operation of the crank 16 and hook 15. Secured to the plate 25 is a hanger 26, the lower end of which is provided with an eye 27, and by which a weight 28 may be secured for holding the same, when an assistant is missing.

From this construction it will be seen that a plurality of strands of cord or twine may be connected at one of their ends to the hooks 21, said strands being passed through the hubs 3 of the gears 4 and clamped therein, whereupon by twisting the same through the gears 4 the strands are united, and as the same pass through and are then connected to the hook 15, which when operated will twist the strands into a single rope owing to the presence of the strand guide 24 which is moved toward the frame 1 as the strands twist.

By providing the link 23 the hooks 21 may be rotated simultaneously, to prevent any undue twisting of the strand before passing through the hubs, or should one strand become twisted, the others would not be twisted, the twisted strands may be straightened out upon removing the link and operating the hook upon which the strands twist. The main twisting frame is adapted to be moved toward the upright 17 only after the guide 24 is moved until it contacts with said frame, and further movement of said guide is arrested.

The standard 14 is secured to some heavy object so that during the operation of the machine it can be moved forwardly, while the uprights 17 remain stationary at all times. It will of course be understood that after the strands have been tightly twisted between the standard 14 and main frame 1, and it is desired to move said frame, it is only necessary to manipulate the ring 6 to permit the frame to move toward the uprights 17.

In operation a plurality of separate strands are attached to the hooks 15, and are thence passed through the hubs 3 and are clamped therein by the rings so that the strands are compelled to twist upon rotation of the hubs, after which said strands are passed through the guide 24 and are connected to the hook 15 so that upon rotation of the hubs through the medium of the master gear 11 the strands will be twisted during which time the guide and standard 1 are moved toward the upright 17.

There is thus provided a novel improvement in devices of this kind which assures quicker and tighter twisting by reason of the automatic proximity of the twisting means to the twisted portion of the rope and the peculiar arrangement of the parts as aforesaid.

What is claimed is:—

1. A rope making machine comprising in combination a movable main twisting frame, triangularly disposed hubs journaled therein, gear teeth carried by the hubs, strand engaging rings carried by the hubs, means engaging the gear teeth to rotate said hubs, a standard mounted adjacent the main frame and upon one side thereof, a hook carried by the standard for engaging the rope, an upright supported adjacent the other side of the main twisting frame, said standard and main twisting frame being adapted for movement toward the upright, a plurality of hand cranks carried by the upright, hooks carried by the hand cranks and adapted to engage strands for forming a rope, and a strand guide adapted to engage the strands between the standard and main twisting frame, as and for the purpose set forth.

2. A rope making machine comprising in combination a movable main twisting frame, hubs journaled in the frame and arranged in triangular relation, gears formed integral with the hubs, a master gear mounted upon said frame, a chain connecting the gears and master gear, slots formed in the hubs, rings operable in said slots to clamp the strands in the hubs, a standard supported adjacent one side of the twisting frame, a hook rotatably mounted upon the standard for engaging the rope strands, said main frame and standard being adapted for movement toward the upright, an upright mounted adjacent the twisting frame and upon its opposite side, a plurality of cranks carried by the upright, hooks formed upon the cranks for engaging separate strands for forming a rope, a strand guide for engaging the strands between the standard and main twisting frame, as and for the purpose set forth.

In testimony whereof, I affix my signature, in presence of two witnesses.

FRANK J. WEISER.

Witnesses:
 HEBRET HENEMAN,
 GERHARD KIMPEL.

---

Copies of this patent may be obtained for five cents each, by addressing the "Commissioner of Patents, Washington, D. C."